US008879455B1

(12) United States Patent
Stephenson et al.

(10) Patent No.: US 8,879,455 B1
(45) Date of Patent: Nov. 4, 2014

(54) POWER MANAGEMENT FOR MULTICAST FRAMES IN WIRELESS NETWORKS

(75) Inventors: David S. Stephenson, San Jose, CA (US); Robert B. O'Hara, Jr., Santa Clara, CA (US); Allan Thomson, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 955 days.

(21) Appl. No.: 11/733,551

(22) Filed: Apr. 10, 2007

(51) Int. Cl.
H04H 20/71 (2008.01)

(52) U.S. Cl.
USPC ............................ 370/312; 370/390; 370/311

(58) Field of Classification Search
USPC .............. 370/338, 310.2, 311, 312, 328, 390; 455/412.1, 463, 572–574; 713/163; 379/355.1
See application file for complete search history.

(56) References Cited

U.S. PATENT DOCUMENTS

| | | | | |
|---|---|---|---|---|
| 6,067,297 | A * | 5/2000 | Beach | 370/389 |
| 2005/0114537 | A1 * | 5/2005 | Griswold et al. | 709/231 |
| 2005/0213576 | A1 * | 9/2005 | Stephens | 370/390 |
| 2007/0060175 | A1 * | 3/2007 | Park et al. | 455/458 |
| 2008/0062948 | A1 * | 3/2008 | Ponnuswamy | 370/342 |
| 2008/0123577 | A1 * | 5/2008 | Jaakkola et al. | 370/311 |
| 2008/0151814 | A1 * | 6/2008 | Jokela | 370/328 |

OTHER PUBLICATIONS

Liu, et al., *A Scheme for Supporting Voice Over IEEE 802.11 Wireless Local Area Network*, Proc. Natl. Sci. Counc. ROC (A), vol. 25, No. 4, 2001. pp. 259-268.
Rohl, et al., *A Short Look on Power Saving Mechanisms in the Wireless LAN Standard Draft IEEE 802.11*, Telecommunications Networks Group, Technical University Berlin (1997).

* cited by examiner

*Primary Examiner* — George Eng
*Assistant Examiner* — Marcus Hammonds
(74) *Attorney, Agent, or Firm* — Baker Botts L.L.P.

(57) ABSTRACT

A multicast delivery system facilitating power management. In particular implementations, a method includes maintaining in the memory a plurality of multicast stream queues, each multicast stream queue associated with a delivery interval; storing frames of respective multicast streams in a multicast stream queue based on a delivery interval associated with the multicast stream; and delivering multicast streams at respective delivery intervals to one or more wireless clients.

18 Claims, 7 Drawing Sheets

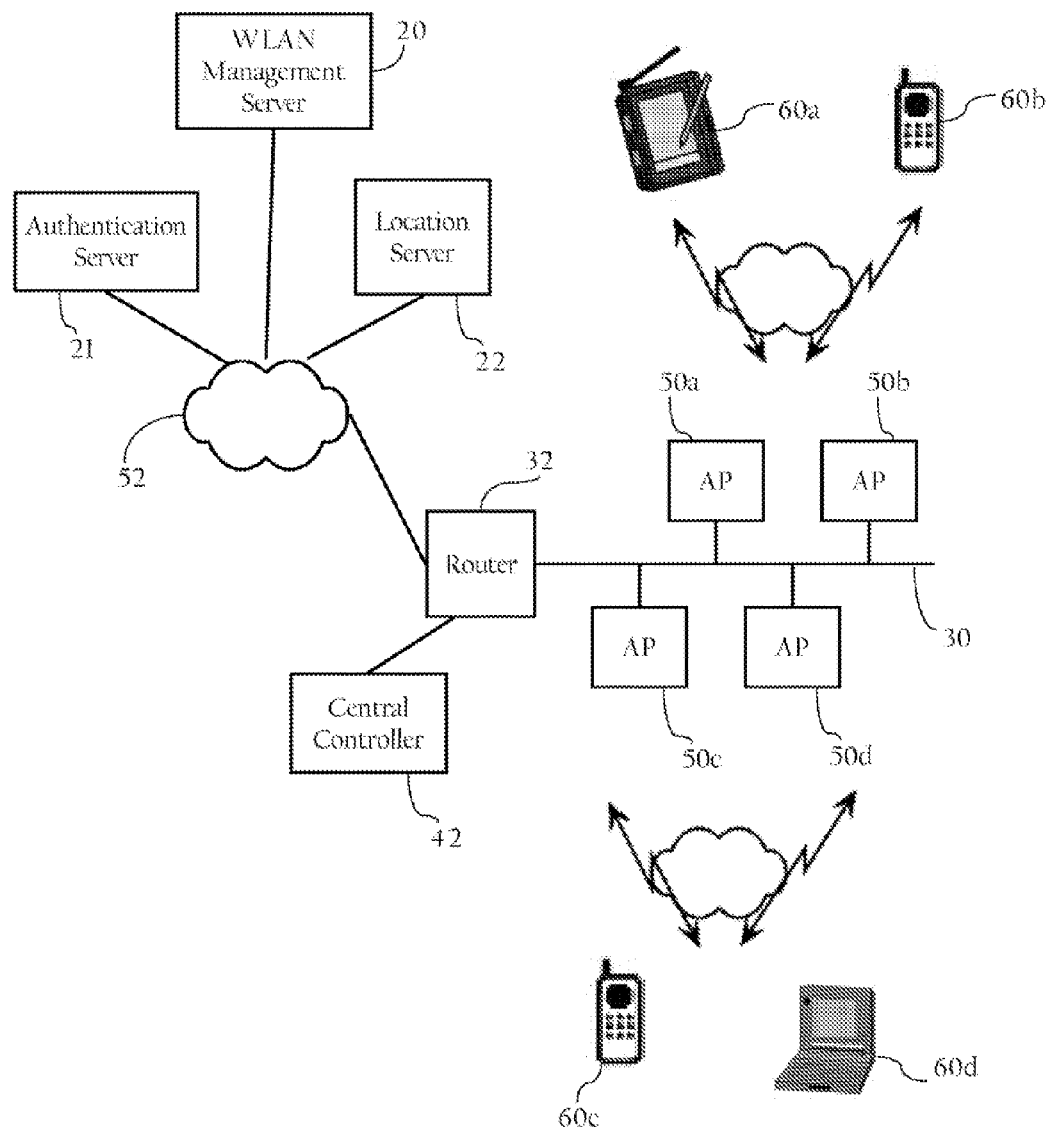
Fig._1A

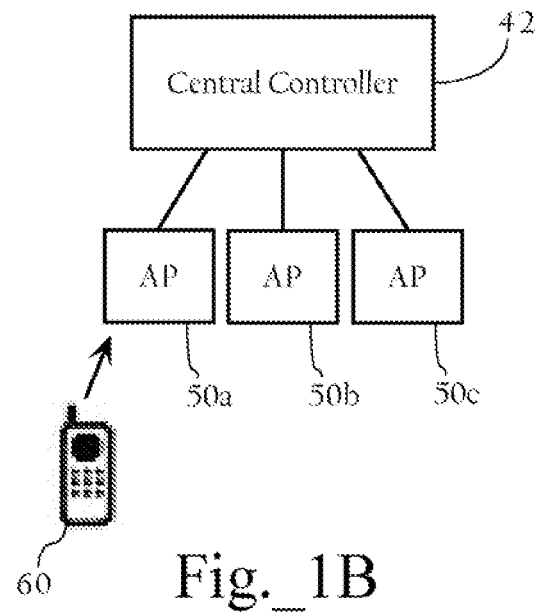
Fig._1B
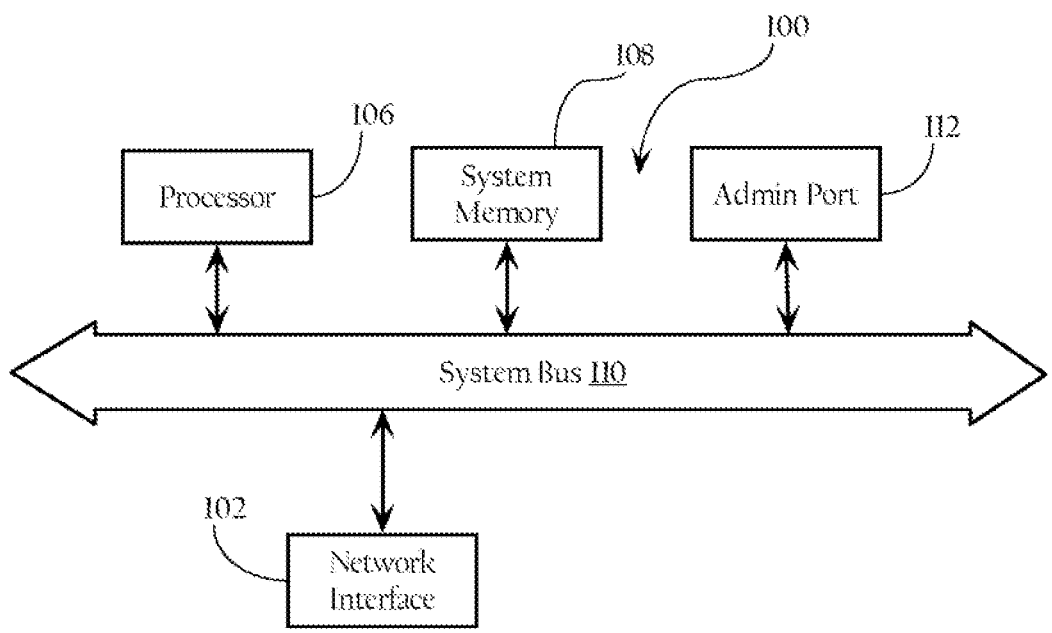
Fig._1C

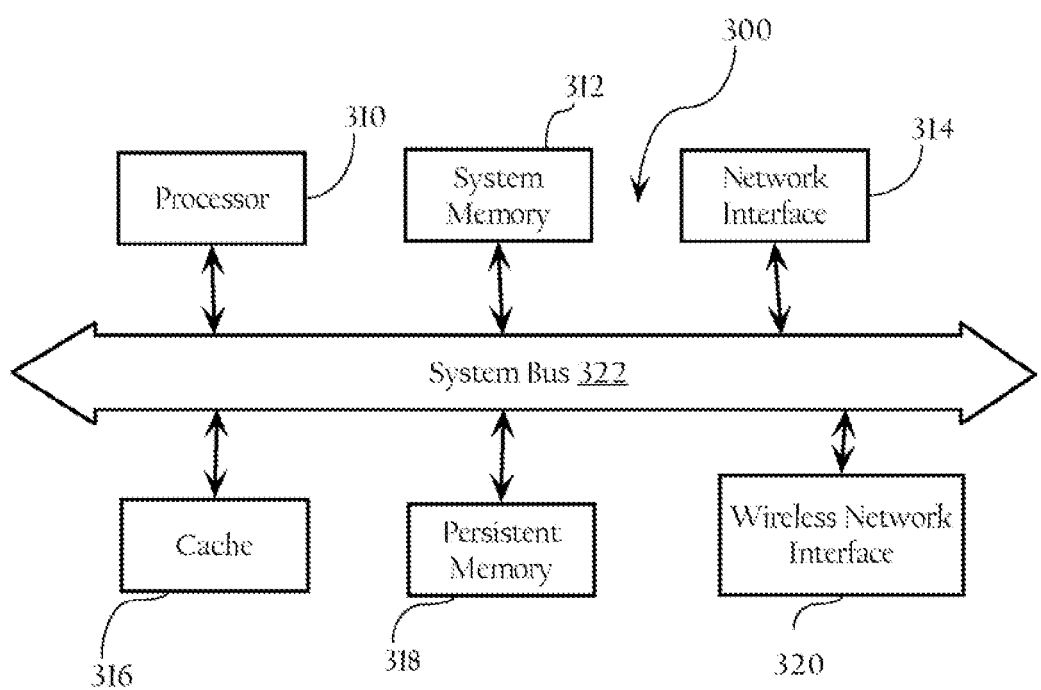
Fig._2

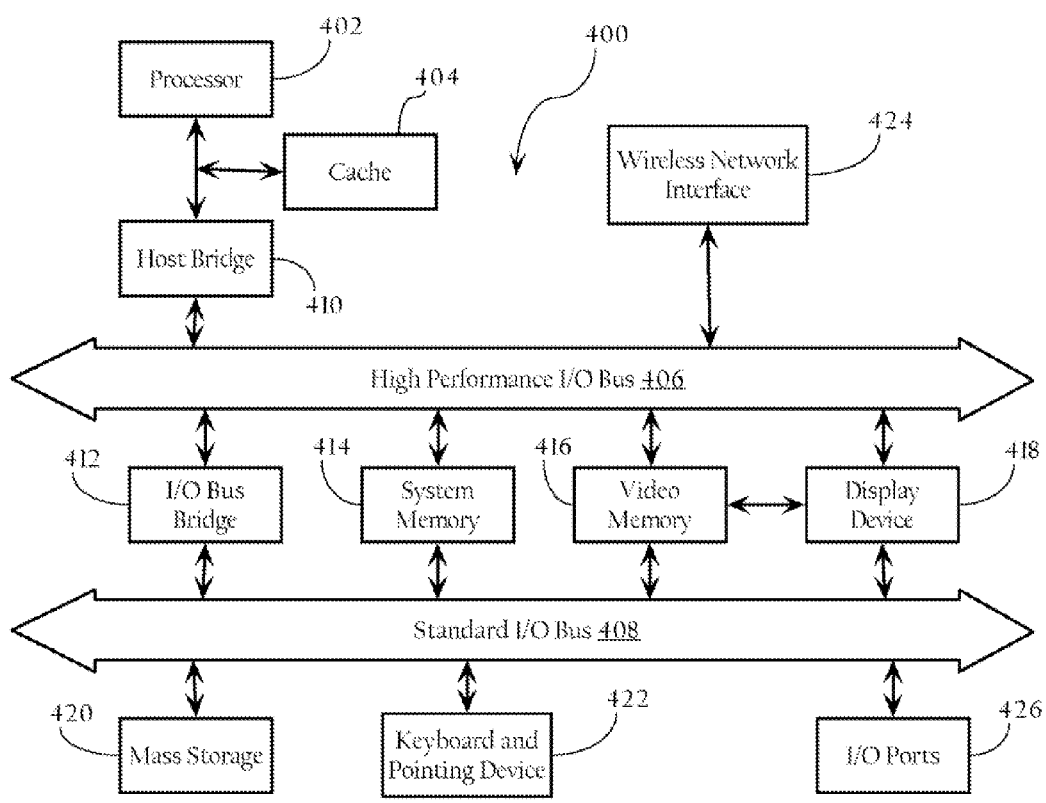
Fig._3

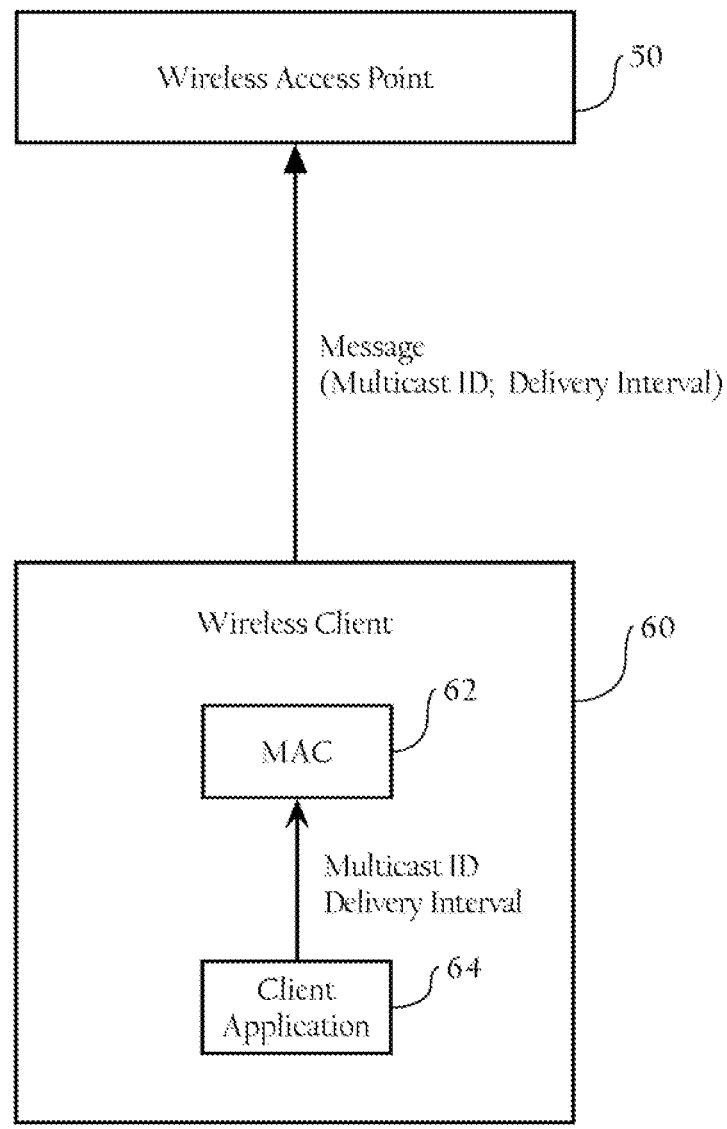
Fig._4

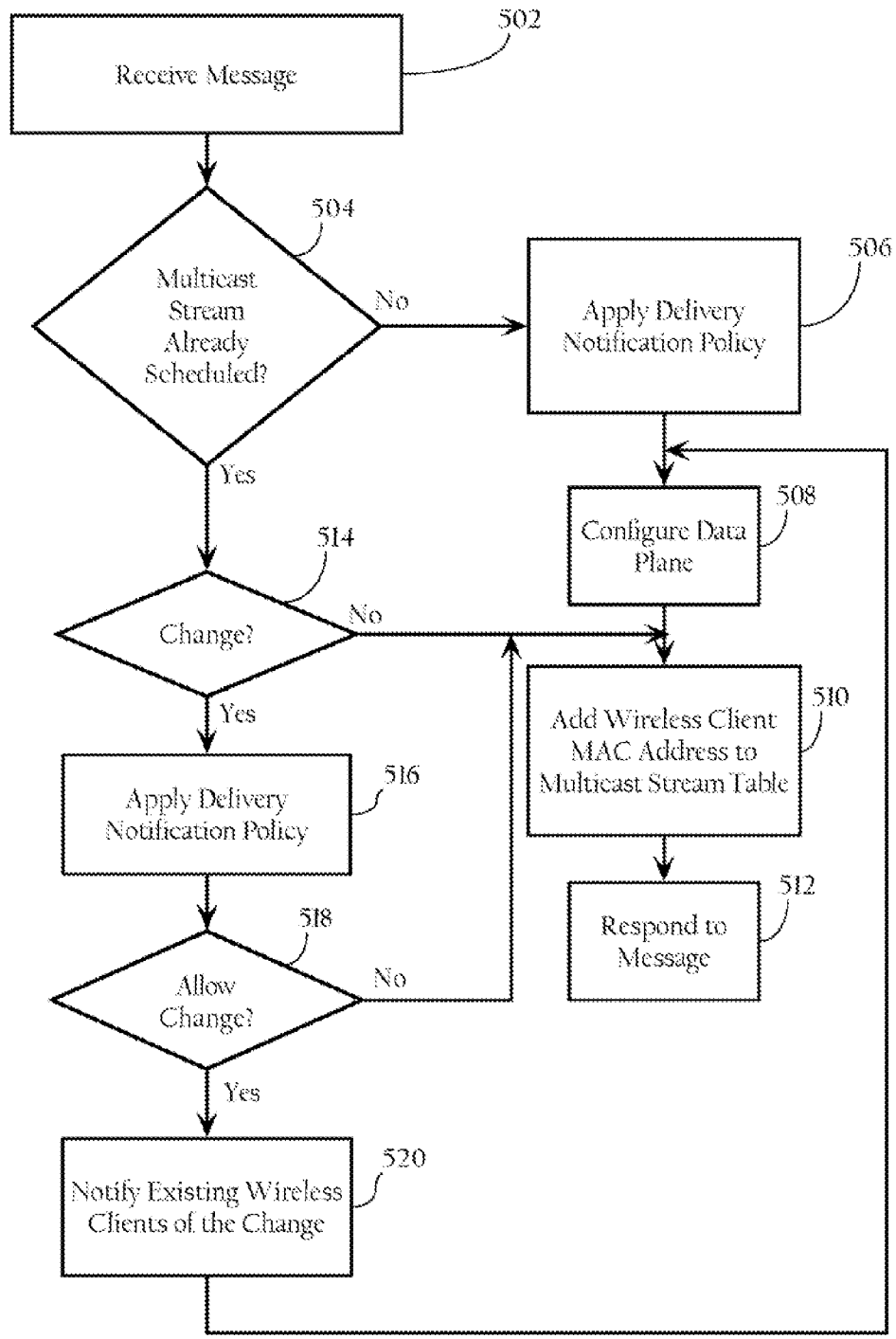
Fig._5

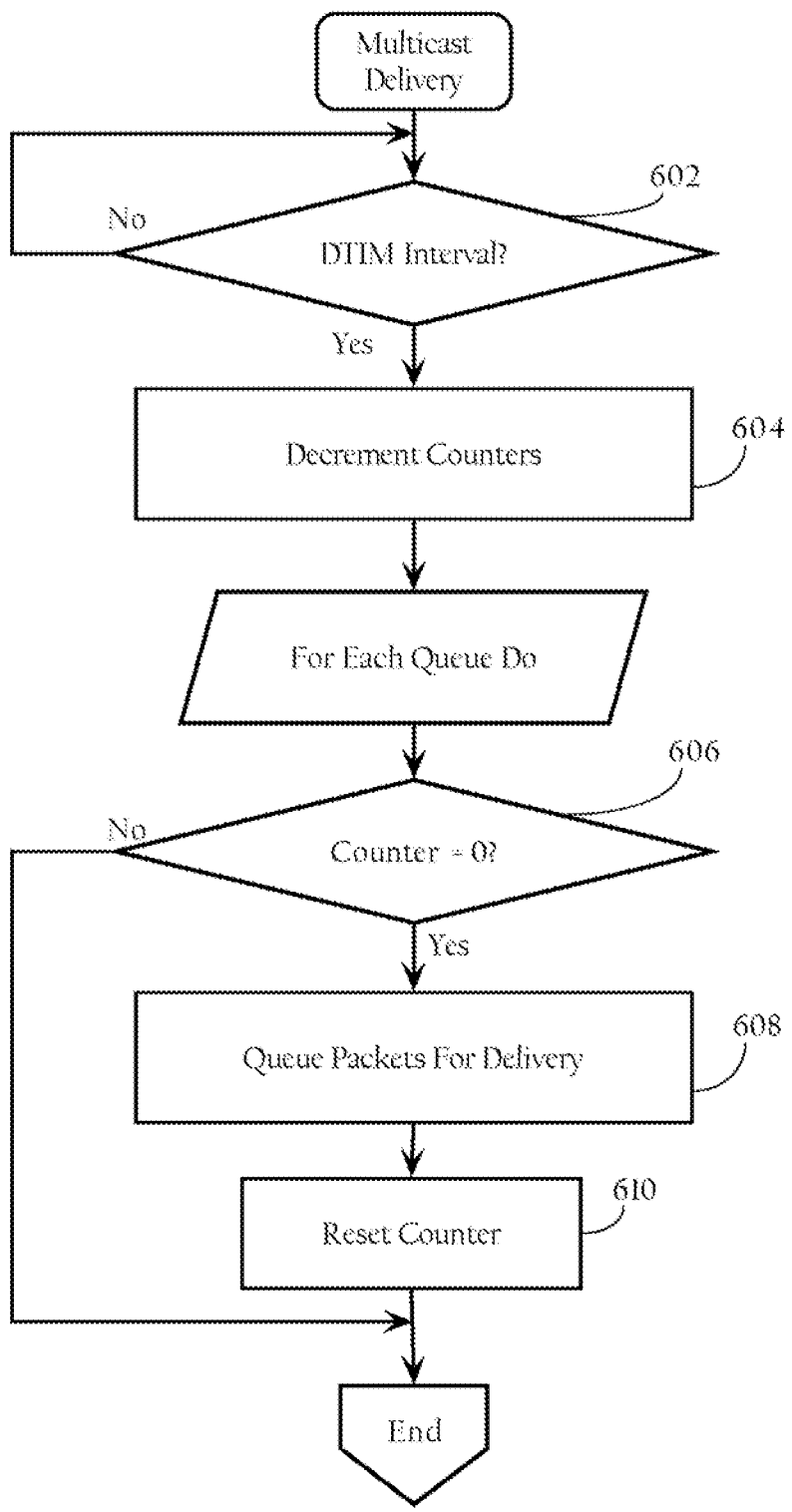
Fig._6

POWER MANAGEMENT FOR MULTICAST FRAMES IN WIRELESS NETWORKS

TECHNICAL FIELD

This disclosure relates generally to wireless networks.

BACKGROUND

Market adoption of wireless LAN (WLAN) technology has exploded, as users from a wide range of backgrounds and vertical industries have brought this technology into their homes, offices, and increasingly into the public air space. This inflection point has highlighted not only the limitations of earlier-generation systems, but also the changing role that WLAN technology now plays in people's work and lifestyles across the globe. Indeed, WLANs are rapidly changing from convenience networks to business-critical networks. Increasingly users are depending on WLANs to improve the timeliness and productivity of their communications and applications, and in doing so, require greater visibility, security, management, and performance from their network.

Multicast is the delivery of information to a group of destination nodes simultaneously over a network. In some networks, a multicast message is one that is transmitted to selected multiple recipients who have joined a corresponding multicast group. The sender has to generate only a single data stream. A multicast-enabled router or other network element generally forwards a multicast message to a particular network only if there are multicast receivers on that network.

Clients typically subscribe to multicast streams using a subscription protocol. In many network deployments, the delivery of multicast traffic involves the dynamic configuration of one or more hierarchical routing and/or switching topologies (multicast trees) among nodes (such as routers, distribution switches, central controllers, access points, etc.). In some implementations, clients transmit join requests that are snooped by one or more network elements in the network infrastructure that process the message and possibly join the hierarchical multicast tree for that stream. In some deployments, the source of the multicast stream is the root of the multicast tree. At any given time, there may be multiple separate multicast trees in a network given the disparate possible sources of multicast traffic.

Beacon frames are transmitted by an access point at regular intervals to announce the existence of the wireless network, and are also used for synchronization purposes. The default behavior is to send a beacon frame once every 100 milliseconds. Beacon frames typically include a Traffic Indication Map information element (TIM IE). In some beacon frames, the TIM IE includes a Delivery Traffic Indication Map (DTIM) message. These beacons are referred to as DTIM beacons. These special DTIM beacons are sent at an interval specified in the DTIM period (measured in beacon intervals), also contained in every beacon. The DTIM beacon alerts the clients that multicast and broadcast packets buffered at the AP will be transmitted immediately after the transmission of this beacon frame. The larger the DTIM period, the longer the delay between the deliveries of multicast frames. After each DTIM interval, the associated wireless clients, in a power save mode, wake up from a power-conservation state in order to receive the multicast stream and then return to the power-conservation state.

DESCRIPTION OF THE DRAWINGS

FIG. 1A illustrates example components in a wireless local area network (WLAN) system.

FIG. 1B illustrates an example hierarchical wireless network including a central controller.

FIG. 1C illustrates an example hardware system, which may be used to implement a central controller.

FIG. 2 illustrates an example hardware system, which may be used to implement a wireless access point.

FIG. 3 illustrates an example hardware system, which may be used to implement a wireless client.

FIG. 4 illustrates an example functional block diagram showing the flow information between a wireless client and a wireless access point.

FIG. 5 illustrates an example method associated with negotiating a delivery interval of a multicast stream.

FIG. 6 illustrates an example method associated with facilitating delivery of a multicast stream.

DESCRIPTION OF EXAMPLE EMBODIMENTS

A. Overview

Particular implementations facilitate power management of stations in wireless networks. In one implementation, a wireless client may negotiate with a wireless access point to establish delivery intervals for one or more multicast streams. In a particular implementation, the requested delivery interval is longer than the DTIM interval. This enables the wireless client to remain in a power-conservation state longer. In other words, the wireless client need not wake up at every DTIM interval in order to receive broadcast and multicast frames but may instead wake up at every negotiated delivery interval (e.g., 400 ms). According to one implementation, during a negotiation phase, the wireless client sends a message to the wireless access point, where the message contains a multicast stream ID and a requested delivery interval.

In one implementation, the wireless access point determines whether to accept a given request based on a delivery notification policy. In one implementation, the delivery notification policy may be based on various factors. For example, the policy may be based on a first-come-first-served basis, the type of multicast stream request, the type of wireless client making the request, etc. In one implementation, the policy may require that delivery interval to be equal to the DTIM interval or a multiple of the DTIM interval. This enables legacy wireless clients to wake up after each DTIM interval, and some wireless clients to wake up less often in order to conserve power, conserving compatibility with legacy clients that do not implement the methods of this invention.

After the wireless access point responds to the request, the wireless access point may notify existing wireless clients of the delivery interval, if accepted, so that the existing wireless clients can adjust their sleep/wake up times accordingly. In one implementation, during a delivery phase, when the wireless access point receives a multicast frame, the wireless access point sends the multicast frame to an appropriate queue for delivery. In one implementation, each queue stores multicast frames of the same delivery interval and outputs the multicast frames for delivery to the wireless client at the appropriate delivery interval. In one implementation, counters enable the queues to output the multicast frames at the appropriate delivery intervals. Each counter has a count value that corresponds to a given delivery time. In one implementation, each counter decrements once each time the wireless access point sends a DTIM frame, and then outputs the multicast frames each time the counter decrements to "0".

B. Example Wireless Network System Architecture

B.1. Network Topology

FIG. 1A illustrates example components in a wireless local area network (WLAN) system. In a specific embodiment of the present invention, the system includes a WLAN management server 20, an Authentication Authorization and Account (AAA) server 21, location server 22, a central controller 24, a local area network (LAN) 30, a router 32, and wireless access points 50*a*, 50*b*, 50*c*, and 50*d*. LAN 30 is implemented by a switch (or an array of switches) and/or other network devices, such as a bridge.

As FIG. 1A illustrates, these network elements are operably connected to a network 52. Network 52, in one implementation, generally refers to a computer network, such as a LAN, a WAN, etc., that includes one or more intermediate network devices (e.g., routers, switches, etc.), which allow for the transmission of messages between WLAN management server 20 and wireless clients via wireless access points 50. Of course, network 52 can include a variety of network segments, transmission technologies and components, such as terrestrial WAN links, satellite links, optical fiber links, and cellular links. Network 52 could also be a campus LAN. LAN 30 may be a LAN, LAN segments implemented by an Ethernet switch (not shown), or an array of switches having multiple ports to which wireless access points 50 are connected. The wireless access points 50 are typically connected to switch ports via Ethernet links; however, other link layer connection protocols or communication means can be employed. FIG. 1A illustrates one possible network environment in which the invention may operate; however, other implementations are possible. For example, although WLAN management server 20 is illustrated as being on a different LAN or LAN segment, it may be co-located with wireless access points 50.

The wireless access points 50 are operative to wirelessly communicate with remote wireless client devices 60*a*, 60*b*, 60*c*, and 60*d*. In one implementation, the wireless access points 50 implement the wireless network protocol specified in the IEEE 802.11 WLAN specification; of course, other wireless network protocols may be used. The wireless access points 50 may be autonomous or so-called "fat" wireless access point or light-weight wireless access points operating in connection with a wireless switch (not illustrated). In addition, the network infrastructure may also include a Wireless IAN Solution Engine (WISE) offered by Cisco Systems, Inc. of San Jose, Calif. or another wireless network management system. In some implementations, the network infrastructure may also include one or more Wireless Control System (WCS) nodes operative to manage one or more wireless switches and access points.

B.2. Central Controller

FIG. 1B illustrates an example hierarchical wireless network including a central controller 42 according to one implementation of the present invention. In one implementation, the central controller 42 may be implemented as a wireless domain server (WDS) or, alternatively, as a wireless switch. If the central controller 42 is implemented with a WDS, the central controller 42 is operative to communicate with autonomous or so-called "fat" wireless access points. If the central controller 42 is implemented as a wireless switch, the central controller 42 is operative to communicate with lightweight wireless access points and process wireless protocol and network management information. As FIG. 1B illustrates, a central controller 42 may be directly connected to one or more access points 50. Alternatively, a central controller 24 may be operably connected to one or more access points over a switched and/or routed network environment, as FIG. 1A illustrates.

FIG. 1C illustrates an example hardware system 100, which may be used to implement a controller 42. As FIG. 1C shows, in one implementation, the central controller 42 includes a network interface 102. Controller 42, in one implementation, further comprises a processor 106, a memory 108, one or more software modules stored in memory 108, including instructions for performing the functions described herein, and a system bus 110 operably connecting these components. The central control elements may optionally include an administrative port 112 allowing for administrative access for such purposes as configuration and diagnostic access.

B.3. Wireless Access Point

FIG. 2 illustrates an example hardware system 300, which may be used to implement a wireless access point 50. In one implementation, the wireless access point 300 includes a processor 310, a memory 312, a network interface 314 (e.g., an 802.3 interface) for communication with a LAN, a cache 316 for storing WLAN information, a persistent memory 318, a wireless network interface 320 (e.g., an IEEE 802.11 WLAN interface) for wireless communication with one or more wireless clients 60, and a system bus 322 interconnecting these components. The wireless access points 50 may also include software modules (including Dynamic Host Configuration Protocol (DHCP) clients, transparent bridging, Lightweight Access Point Protocol (LWAPP), Cisco Discovery Protocol (CDP) modules, wireless access point modules, Simple Network Management Protocol (SNMP) functionality, etc., and device drivers (e.g., network and WLAN interface drivers) stored in persistent memory 318 (e.g., a hard disk drive, flash memory, EEPROM, etc.). At start up, these software components are loaded into system memory 312 and then accessed and executed by processor 310.

In particular implementations, the wireless access points 50 include a control plane, which is a software module operative to execute the functionalities of the negotiation phase described herein. In particular implementations, the wireless access points 50 also include a data plane, which is a software module operative to execute the functionalities of the delivery phase described herein.

B.4. Wireless Client

FIG. 3 illustrates an example hardware system 400, which may be used to implement a wireless client 60. In one embodiment, hardware system 400 includes a processor 402 and a cache memory 404 coupled to each other as shown. Additionally, hardware system 400 includes a high performance input/output (I/O) bus 406 and a standard I/O bus 408. A host bridge 410 couples processor 402 to high performance I/O bus 406, whereas an I/O bus bridge 412 couples the two buses 406 and 408 to each other. Hardware system 400 also includes a wireless network interface 424, a system memory 414, and a video memory 416 couple to bus 406. In turn, a display device 418 couples to video memory 416. A mass storage 420, a keyboard and pointing device 422, and I/O ports 426 couple to bus 408. Collectively, these elements are intended to represent a broad category of computer hardware systems, including but not limited to general purpose computer systems based on the Pentium processor manufactured by Intel Corporation of Santa Clara, Calif., as well as any other suitable processor.

The remaining elements of hardware system 400 are described below. In particular, wireless network interface 424 provides communication between hardware system 400 and any of a wide range of wireless networks, such as a WLAN (i.e., IEEE 802.11), WiMax (i.e., IEEE 802.16), Cellular (e.g., GSMA), etc. Mass storage 420 provides permanent storage for the data and programming instructions to perform the above described functions implemented in the system controller, whereas system memory 414 (e.g., DRAM) is used to provide temporary storage for the data and programming instructions when executed by processor 402. I/O ports 426 are one or more serial and/or parallel communication ports that provide communication between additional peripheral devices, which may couple to hardware system 400.

Hardware system 400 may include a variety of system architectures; and various components of hardware system 400 may be rearranged. For example, cache 404 may be on-chip with processor 402. Alternatively, cache 404 and processor 402 may be packed together as a "processor module," with processor 402 being referred to as the "processor core." Furthermore, certain implementations of the present invention may not require nor include all of the above components. For example, the peripheral devices shown coupled to standard I/O bus 408 may couple to high performance I/O bus 406. In addition, in some implementations only a single bus may exist, with the components of hardware system 400 being coupled to the single bus. Furthermore, hardware system 400 may include additional components, such as additional processors, storage devices, or memories.

In one embodiment, the operations of wireless client-side functionality are implemented as a series of software routines run by hardware system 400. These software routines, which can be embodied in a wireless network interface driver, comprise a plurality or series of instructions to be executed by a processor in a hardware system, such as processor 402. Initially, the series of instructions are stored on a storage device, such as mass storage 420. However, the series of instructions can be stored on any suitable storage medium, such as a diskette, CD-ROM, ROM, etc. Furthermore, the series of instructions need not be stored locally, and could be received from a remote storage device, such as a server on a network, via network/communication interface 424. The instructions are copied from the storage device, such as mass storage 420, into memory 414 and then accessed and executed by processor 402. In alternate embodiments, the present invention is implemented in hardware or firmware.

While FIG. 3 illustrates, for didactic purposes, the hardware architecture of a wireless client according to one implementation of the present invention, the wireless client may, however, be implemented on a wide variety of computer system architectures, such as special purpose, hand held or portable devices, Personal Digital Assistants (e.g., converged devices which support WLAN data+voice), Laptop computers, hand-held phones, and the like. An operating system manages and controls the operation of hardware system 400, including the input and output of data to and from software applications (not shown). The operating system provides an interface, such as a graphical user interface (GUI), between the user and the software applications being executed on the system. According to one embodiment of the present invention, the operating system is the Windows® 95/98/NT/XP/Vista operating system and/or Windows® CE (WinCE) operating system, available from Microsoft Corporation of Redmond, Wash. However, the present invention may be used with other operating systems, such as the Apple Macintosh Operating System, available from Apple Computer Inc. of Cupertino, Calif., UNIX operating systems, LINUX operating systems, Symbian operating systems, and the like.

C. Multicast Stream Delivery Negotiation

FIG. 4 illustrates an example functional block diagram showing the flow of information between a wireless client 60 and a wireless access point 50. As FIG. 4 shows, the wireless client 60, in one implementation, includes a Media Access Control (MAC) layer 62 and a client application 64. In operation, generally, the wireless access point 50 broadcasts beacon frames that advertise multicast streams that are currently supported and the available delivery intervals for the multicast streams. This allows client applications, as potential consumers of the multicast streams, to determine the current delivery interval.

In one implementation, the wireless client application 64 may access APIs of the MAC layer 62 causing it to transmit a message for a particular multicast stream, where the message includes a multicast ID and a delivery interval. In one implementation, the message may be an action frame. In some particular implementations, the client application 64 may send a latency requirement (e.g., maximum latency), as different applications may have different latency tolerances, in addition to or in lieu of a delivery interval. As described in more detail below, the wireless access point accepts or rejects the request. In one implementation, the wireless access point may respond with an alternative delivery interval to the requested interval. If the wireless client 60 provides a latency requirement and the request delivery interval is not available, the wireless access point may provide an alternative delivery interval that still satisfies the latency requirement.

FIG. 5 illustrates an example method associated with negotiating a delivery interval of a multicast stream. In a particular implementation, the method illustrated in FIG. 5 is a control plane operation that may be implemented by an autonomous wireless access point or a central controller controlling a light-weight access point. For purposes of description, the method is described as being implemented by a wireless access point. As FIG. 5 shows, the wireless access point 50 receives a message from a wireless client (502). In one implementation, the message may include a multicast stream ID and a delivery interval (e.g., every 100 ms, 200 ms, or 300 ms, etc.). In one implementation, the message may utilize an 802.11e Traffic Classification (TCLAS) information element (IE) to indicate the multicast stream ID and delivery interval, maximum latency, IP address, MAC address, etc.

The wireless access point 50 then determines whether the multicast stream is already scheduled (504). If the multicast stream is not already scheduled, the wireless access point 50 then applies a delivery notification policy (506). The wireless access point 50 may also perform other processes, such as forwarding a multicast join request or joining a multicast tunnel to receive the selected multicast stream. In one implementation, the application of the delivery notification policy results in accepting, rejecting or modifying the requested delivery notification interval. In particular implementation, the wireless access point 50 makes policy determinations based on a variety of factors, such as the multicast stream attributes, acceptability of notification interval (e.g., max delivery interval), one or more attributes of the wireless client, etc. For example, in one implementation, the policy may not allow certain delivery intervals with some particular multicast streams or stream types. In modifying a requested delivery interval, the policy may allow the wireless access point 50 to provide an alternative delivery interval (e.g., a delivery time of 200 ms instead of a requested 400 ms). As indicated above, if the wireless client 60 provides other requirements (e.g., latency requirements) in the message, the wireless access point 50 may provide an alternative delivery interval that still complies with the requirements of the wireless client 60.

The policy may also be based on wireless client attributes (e.g., MAC address, type of wireless client, etc.). For example, some types of wireless clients, such as voice handsets, that subscribe to a push-to-talk group may not be in a power-save state very often. As such wireless clients are constantly looking for multicast service. Other types of wireless clients such as those used in gaming wake up less often to discover the presence of other gaming wireless clients.

In one implementation, the notification delivery policy may be based on wireless access point policies (e.g., first-come-first-served, last-to-request, etc.). In one implementation, the delivery times permitted are multiples of the existing DTIM intervals. As such, while some legacy wireless clients may wake up at each DTIM interval (e.g., every 200 ms) to receive particular multicast streams, new wireless clients may wake up less often when needed (e.g., every 200 ms, 400 ms, etc.) to receive multicast streams. Other delivery notification policies may include global policies providing for minimum and maximum delivery intervals across all streams.

The wireless access point 50 then configures the data plane to deliver the multicast stream at the negotiated delivery interval (508). The wireless access point then adds the wireless client MAC address to a multicast stream map table (510). The wireless access point 50 then responds to the message (512). In one implementation, the wireless access point may utilize an 802.11e TCLAS IE to respond to the message. Using a TCLAS IE may remove any ambiguities as to which multicast addresses are accepted or rejected.

If the multicast stream is already scheduled (504), the wireless access point 50 then determines if the requested delivery interval in the message represents a change to the delivery interval for the scheduled multicast stream for existing wireless clients (514). If there would be no change, the wireless access point 50 adds the wireless client MAC address to a multicast stream map table (510).

If the multicast stream is already scheduled (504) and there would be a change (514), the wireless access point 50 applies a delivery notification policy (516). Similar to box 506 above, the policy determines if the wireless access point will accept or reject the message or modify the requested action based on multicast stream attributes, wireless client attributes, etc. In one particular implementation, the delivery notification policies may be augmented to include policies based on the attributes of the existing subscriber clients to the multicast stream, and the current delivery notification interval. Additional delivery notification policies can be configured to disallow a change if a previous change occurred within a configurable time window.

If the wireless access point would not allow a change (518), the wireless access point adds the wireless client MAC address to a multicast stream map table (510), without the change. If the wireless access point would allow a change (518), the wireless access point then notifies existing wireless clients of the change (520) so that they can adjust to the change accordingly (e.g., change their wake up times). The wireless access point then configures the data plane to deliver the multicast stream at the negotiated delivery interval (508).

In one implementation, the wireless access point 50 may determine if the new delivery interval is compatible with the existing delivery intervals expected by existing wireless clients. In one implementation, if the new delivery interval is compatible with the existing delivery intervals the wireless access point 50 may send a unicast message to the existing wireless clients to notify them of the change. In one implementation, the message may include an IE with a schedule that identifies multicast streams and the delivery interval. As such, a given existing wireless client will see the message upon awakening and may then adjust to the new delivery interval accordingly. Some legacy clients may continue to wake up at the end of each DTIM interval (e.g., every 100 ms) but might not receive a given particular multicast stream until its scheduled delivery time (e.g., every 400 ms).

D. Multicast Stream Delivery

FIG. 6 illustrates an example method associated with delivery multicast streams at respective delivery notification intervals. As a background process, when the wireless access point receives a multicast frame corresponding to a given multicast stream, the wireless access point 50 checks a multicast stream map table to select a queue to buffer the frame. As described above, the multicast stream map table indicates the delivery interval (e.g., 200 ms, 400 ms, 800 ms, etc.), and a TCLAS IE. Optionally, the multicast stream map table may also include, a reset counter value associated with a delivery interval for a multicast stream. In one implementation, the reset counter value expresses the delivery interval relative to the DTIM interval. In one implementation, each TCLAS IE indicates a class of multicast streams based on one or more attributes. In one implementation, a given queue may buffer frames of one or more multicast streams that share the same delivery notification interval. In other words, the wireless access point 50 places the multicast frame in a DTIM delivery queue associated with the delivery notification interval.

In one implementation, each DTIM delivery queue is associated with a counter, the value of which indicates when any buffered frames should be scheduled for delivery. As FIG. 6 illustrates, the wireless access point decrements the counter values of the queues (604) at each DTIM interval (602). Additionally, for each DTIM delivery queue, the wireless access point 50 determines if the corresponding counter has reached "0" (606). Each time a counter of a given queue reaches 0, the wireless access point 50 schedules all of the packets in the DTIM delivery queue for transmission (608), and resets the counter according to the delivery notification interval for that D'IM delivery queue (610).

The present invention has been explained with reference to specific embodiments. For example, while embodiments of the present invention have been described as operating in connection with IEEE 802.11 networks, the present invention can be used in connection with any suitable wireless network environment. Other embodiments will be evident to those of ordinary skill in the art. It is therefore not intended that the present invention be limited, except as indicated by the appended claims.

What is claimed is:

1. An apparatus comprising
a memory;
one or more processors; and
logic encoded in one or more tangible media for execution and when executed operable to cause the one or more processors to:
maintain in the memory a plurality of multicast stream queues, each multicast stream queue corresponding to a multicast stream and associated with a delivery interval of a plurality of delivery intervals, the delivery interval representing a time interval for delivering the multicast stream;
store one or more multicast frames in one of the plurality of multicast stream queues based on the delivery interval associated with the multicast stream; and
receive a request from a first wireless client of one or more wireless clients, the request including a multicast stream identifier and a requested delivery interval for the identified multicast stream;
determine whether the delivery interval for the identified multicast stream has changed within a configurable time window;
when it is determined that the delivery interval of the identified multicast stream has not changed within the configurable time window, associate the identified multicast stream to a multicast stream queue corresponding to the requested delivery interval;

notify one or more wireless clients other than the first wireless client of the requested delivery interval; and deliver the identified multicast stream at the requested delivery interval to at least the first wireless client.

2. The apparatus of claim 1 wherein the logic is further operable to cause the one or more processors to apply, responsive to the request, one or more policies operative to determine a delivery interval for the identified multicast stream.

3. The apparatus of claim 1 wherein the logic is further operable to cause the one or more processors to;

transmit beacon frames at a first periodic interval; and append Delivery Traffic Indication Map (DTHM) information to the beacon frames at a second periodic interval, wherein the second periodic interval is a multiple of the first periodic interval, and wherein the delivery intervals corresponding to the respective multicast stream queues are multiples of the second periodic interval.

4. The apparatus of claim 3 wherein the logic is further operable to cause the one or more processors to transmit one or more frames of multicast streams directly after transmission of beacon frames.

5. A non-transitory computer-readable medium comprising computer executable instructions operative, when executed, to cause a processing system to:

transmit beacon frames at a first periodic interval;

receive a request including a multicast stream identifier, wherein the request includes a requested delivery interval for the identified multicast stream and a maximum latency requirement, wherein the requested delivery interval is a multiple of the first periodic interval and represents a time interval for delivering the identified multicast stream;

determine whether the delivery interval for the identified multicast stream has changed within a configurable time window;

when it is determined that the delivery interval of the identified multicast stream has not changed within the configurable time window, apply, responsive to the request, one or more policies operative to determine a delivery interval for the identified multicast stream based on the requested delivery interval and the maximum latency requirement; and deliver the identified multicast stream at the determined delivery interval, wherein the delivery of the identified multicast stream includes appending Delivery Traffic Indication Map (DTIM) information for the multicast stream to the beacon frames at the determined delivery interval.

6. A non-transitory computer-readable medium of claim wherein the policy is further based on a type of multicast stream.

7. A non-transitory computer-readable medium of claim wherein the policy is further based on a type of wireless client.

8. A non-transitory computer-readable medium of claim 5 wherein the logic is further operable to store multicast frames in queues for delivery, where each queue corresponds to a different delivery interval.

9. A method comprising:

maintaining in the memory a plurality of multicast stream queues, each multicast stream queue corresponding to a multicast stream and associated with a delivery interval of a plurality of delivery intervals, the delivery interval representing a time interval for delivering the multicast stream;

storing one or more multicast frames in one of the plurality of multicast stream queues based on the delivery interval associated with the multicast stream; and receiving a request from a first wireless client of one or more wireless clients, the request including a multicast stream identifier and a requested delivery interval for the identified multicast stream;

determine whether the delivery interval for the identified multicast stream has changed within a configurable time window;

when it is determined that the delivery interval of the identified multicast stream has not changed within the configurable time window, associating the identified multicast stream to a multicast stream queue corresponding to the requested delivery interval;

notifying one or more wireless clients other than the first wireless client of the requested delivery interval; and deliver the identified multicast stream at the requested delivery interval to at least the first wireless client.

10. The method of claim 9 further comprising applying, responsive to the request, one or more policies operative to determine a delivery interval for the identified multicast stream.

11. The method of claim 9 further comprising:

transmitting beacon frames at a first periodic interval; and appending Delivery Traffic Indication Map (DTIM) information to the beacon frames at a second periodic interval, wherein the second periodic interval is a multiple of the first periodic interval, and wherein the delivery intervals corresponding to the respective multicast stream queues are multiples of the second periodic interval.

12. The method of claim 11 further comprising transmitting one or more frames of multicast streams directly after transmission of beacon frames.

13. A non-transitory computer-readable medium comprising computer executable instructions operative, when executed, to cause a processing system to:

generate a request at a wireless client, the request including a multicast stream identifier and a requested delivery interval for the identified multicast stream and a maximum latency requirement, wherein the requested delivery interval is a multiple of a beacon frame interval; and transmit the request to a wireless access point;

receive a response from the wireless access point identifying a determined delivery interval for the multicast stream, wherein, when it is determined that a delivery interval of the identified multicast stream has not changed within a configurable time window, the determined delivery interval is the requested delivery interval or an alternative delivery interval based on the requested delivery interval and the maximum latency requirement; and enter a power save mode to wake up at the determined delivery interval included in the response to the request to receive the identified multicast stream.

14. A non-transitory computer-readable medium of claim 13 wherein a given requested delivery interval is based on one or more requirements of a wireless client device and a wireless client application.

15. A method comprising:

generating a request at a wireless client, the request including a multicast stream identifier and a requested delivery interval for the identified multicast stream and a maximum latency requirement, wherein the requested delivery interval is a multiple of a beacon frame interval; and transmitting the request to a wireless access point;

receiving a response from the wireless access point including a determined delivery interval for the identified multicast stream, wherein, when it is determined that a delivery interval of the identified multicast stream has not changed within a configurable time window, the determined delivery interval is the requested delivery interval or an alternative delivery interval based on the requested delivery interval and the maximum latency requirement; and entering a power save mode to wake up at the determined delivery interval included in the response to the request to receive the identified multicast stream.

16. The method of claim 15 wherein a given requested delivery interval is based on one or more requirements of a wireless client device and a wireless client application.

17. A system comprising:

a wireless client operable to generate a request including a multicast stream identifier and a requested delivery interval for the identified multicast stream and a maximum latency requirement, wherein the requested delivery interval is a multiple of a beacon frame interval; transmit the request to a wireless access point; receive a response from the wireless access point including a determined delivery interval for the identified multicast stream, wherein, when it is determined that a delivery interval of the identified multicast stream has not changed within a configurable time window, the determined delivery interval is the requested delivery interval or an alternative delivery interval based on the requested delivery interval and the maximum latency requirement; and enter a power save mode to wake up at the determined delivery interval included in the response to the request to receive the identified multicast stream; and a wireless network infrastructure node operable to communicate with the wireless client.

18. The system of claim 17 wherein a given requested delivery interval is based on one or more requirements of a wireless client device and a wireless client application.

* * * * *